(12) United States Patent
Rottier et al.

(10) Patent No.: US 8,693,639 B2
(45) Date of Patent: Apr. 8, 2014

(54) INTERNET PHONE TRAINER

(75) Inventors: Riaan Rottier, Lane Cove (AU); Stuart Thomas, London (GB); Peter Gibson, South Coogee (AU)

(73) Assignee: Cochlear Limited, Macquarie University, NSW (AU)

( * ) Notice: Subject to any disclaimer, the term of this patent is extended or adjusted under 35 U.S.C. 154(b) by 0 days.

(21) Appl. No.: 13/277,944

(22) Filed: Oct. 20, 2011

(65) Prior Publication Data

US 2013/0101095 A1    Apr. 25, 2013

(51) Int. Cl.
*H04M 1/24* (2006.01)
*H04M 3/08* (2006.01)
*H04M 3/22* (2006.01)

(52) U.S. Cl.
USPC ...................... 379/27.02; 379/22.02

(58) Field of Classification Search
USPC ............... 379/27.02, 1.03, 22.02, 28; 381/60, 381/312; 370/247; 375/224, 231
See application file for complete search history.

(56) References Cited

U.S. PATENT DOCUMENTS

| 6,351,521 B1* | 2/2002 | DuRee et al. ............. 379/15.01 |
| 7,831,025 B1* | 11/2010 | Francis et al. ............. 379/1.01 |
| 8,010,366 B1* | 8/2011 | Kearby et al. ................ 704/271 |
| 2006/0029912 A1 | 2/2006 | Kearby et al. |
| 2008/0124685 A1* | 5/2008 | Chalupper .................... 434/112 |

* cited by examiner

*Primary Examiner* — Quoc D Tran
(74) *Attorney, Agent, or Firm* — McDonnell Boehnen Hulbert & Berghoff LLP (57) ABSTRACT

A training system is disclosed. The training system includes a server. The server includes a processor, data storage, a data input/output interface, and a voice interface. The data input/output interface is configured to provide a web-based interface to a data terminal and to receive, from the data terminal and via the web-based interface, both an identifier identifying at least one voice terminal and at least one response. The voice interface is configured to transmit at least one audio test signal corresponding to at least one audio test to the at least one voice terminal. The response is a response to the at least one audio test. In one embodiment, the voice terminal and the data terminal are combined in a single device.

27 Claims, 11 Drawing Sheets

INTERNET PHONE TRAINER

BACKGROUND

Cochlear implants may provide a person having sensorineural hearing loss with the ability to perceive sound by stimulating the person's auditory nerve via an array of electrodes implanted in the person's cochlea. An external component of the cochlear implant detects sound waves, which are converted into a series of electrical stimulation signals delivered to the implant recipient's auditory nerve via the array of electrodes. Stimulating the auditory nerve in this manner may enable the cochlear implant recipient's brain to perceive a hearing sensation that is similar to the natural hearing sensation delivered to the auditory nerve.

Cochlear implants thus offer cochlear implant recipients an approximation of natural hearing. However, there remain many challenges for cochlear implant recipients associated with using cochlear implants. Among these challenges is using the telephone.

For a cochlear implant recipient, telephone use is difficult for several reasons. First, speech heard over the phone can sound different than speech heard in person, meaning in some cases the cochlear implant recipient may be hearing unfamiliar sounds. Second, many cochlear implant recipients rely on lip-reading and other visual cues from a speaker to bolster their understanding of the hearing sensation provided by the cochlear implant. When using the telephone, however, such visual cues are typically not possible. Finally, the position of the telephone speaker and/or coil in relation to the microphone or telecoil associated with the cochlear implant can have a significant effect on the quality of the sound as perceived by the cochlear implant recipient, and it often takes some experimentation to determine the optimal position for various telephones and environments. Between unfamiliar sounds, a lack of visual cues, and difficulty in positioning, telephone use may become frustrating and undesirable for many cochlear implant recipients.

Some cochlear implant recipients have found that, with practice, they can learn to confidently use the telephone. In many cases, this practice involves the cochlear implant recipient enlisting the help of one or more people, such as relatives, friends, and/or clinicians. The people may speak to the cochlear implant recipient over the telephone or in a mock setting, so as to allow the cochlear implant recipient to practice interpreting speech heard over the telephone. Such practice can be beneficial to the cochlear implant recipient, in particular because the people can interact with and provide feedback to the cochlear implant recipient.

While such practice may be effective, it may also be time consuming for the people enlisted to help the cochlear implant recipient. In some cases, the people may not always be available to aid the cochlear implant recipient in practicing. Further, in some cases, the people may not know how or may not be able to provide speech at a level of clarity and complexity that is appropriate for the cochlear implant recipient. Still further, the cochlear implant recipient may wish to improve his or her confidence before using the telephone with another person.

SUMMARY

Disclosed herein is a training system for training a cochlear implant recipient or other hearing prosthesis recipient to use a telephone. The training system includes a voice terminal, a data terminal, and a server. The voice terminal includes (i) an input interface configured to receive at least one audio test signal from the server and (ii) an output interface including a transducer and configured to output at least one audio test corresponding to the audio test signal. The data terminal includes (i) a display configured to display a web-based interface provided by the server, (ii) a user input interface configured to receive both an identifier identifying the voice terminal and at least one response to the at least one audio test output by the voice terminal, and (iii) a data output interface configured to transmit both the identifier and the at least one response to the server. The server includes a data input/output interface configured to (i) provide the web-based interface to the data terminal and (ii) to receive, from the data terminal and via the web-based interface, both the identifier and the at least one response. The server also includes a voice interface configured to transmit the at least one audio test signal to the voice terminal. In some embodiments, the identifier is a telephone number.

In some embodiments, the at least one audio test comprises at least one prerecorded spoken phrase. The phrase may be one word or a series of words. In this embodiment, the at least one response may be a textual input of at least a portion of the prerecorded spoken phrase. Alternatively or additionally, the at least one response may be a selection of a text version of the prerecorded spoken phrase from a plurality of available text versions of phrases. Still alternatively or additionally, the at least one response may be a request to repeat the prerecorded spoken phrase. Still alternatively or additionally, the at least one response may be an indication of how well a user heard the prerecorded spoken phrase. Still alternatively or additionally, the at least one response may be an indication of whether the prerecorded spoken phrase was the same as or different than a previous prerecorded spoken phrase. Still alternatively or additionally, the at least one response may be a selection of a graphical image corresponding to the prerecorded spoken phrase.

In some embodiments, the audio test comprises audio output at a particular frequency. In these embodiments, the at least one response may be an indication of how well a user heard the audio test corresponding to the audio test signal.

In some embodiments, the data terminal user input interface is further configured to (i) receive custom text associated with a personalized audio test and (ii) transmit the custom text to the server. In these embodiments, the data input/output interface may be further configured to receive the custom text and to convert the custom text to the audio test signal.

In some embodiments, the voice terminal and the data terminal are combined in a single physical device. In other embodiments, the voice terminal and the data terminal may be different physical devices.

A server for use in a training system is also disclosed. The server includes a processor, data storage, a data input/output interface, and a voice interface. The data input/output interface is configured to provide a web-based interface to a data terminal and to receive, from the data terminal and via the web-based interface, both an identifier identifying at least one voice terminal and at least one response. The voice interface is configured to transmit at least one audio test signal corresponding to at least one audio test to the at least one voice terminal. The at least one response is a response to the at least one audio test.

In some embodiments, the server further includes audio test logic executable by the processor to (i) select the at least one audio test, (ii) determine whether the at least one response is correct or incorrect, and/or (iii) store the at least one response in the data storage. In some embodiments, the audio test logic is further executable by the processor to (i) generate training results based on at least one of (i-a) the at least one audio test, (i-b) a difficulty of the at least one audio test, and (i-c) the at least one response, and (ii) display the results via the web-based interface.

Training methods are also disclosed. In some embodiments, the method includes a server providing a web-based interface to a data terminal and the server receiving, from the data terminal and via the web-based interface, an identifier identifying at least one telephone destination. The method further includes (i) the server transmitting at least one audio test signal corresponding to at least one audio test to the at least one telephone destination and (ii) the server receiving, from the data terminal and via the web-based interface, at least one response to the at least one audio test.

In some embodiments, the method further includes, after transmitting the at least one audio test signal to the at least one telephone destination, the server displaying, via the web-based interface, an image related to the at least one audio test. Alternatively or additionally, the server may display a light indicating a pattern of sounds in the at least one audio test. Still alternatively or additionally, the server may display a visual representation of a pair of lips speaking the at least one audio test.

In some embodiments, the method further includes the server determining whether the at least one response is correct or incorrect. In some embodiments, responsive to determining that the at least one response is incorrect, the server retransmits the audio test signal to the at least one telephone destination. Alternatively or additionally, responsive to determining that the at least one response is incorrect, the server may display a hint via the web-based interface. Still alternatively or additionally, responsive to determining that the at least one response is incorrect, the server may select an additional audio test. In some embodiments, the selection is based on the at least one audio test. Alternatively or additionally, the selection is based on a difficulty of the at least one audio test. Alternatively or additionally, the selection is based on the at least one response.

In some embodiments, the method further includes the server recording the at least one response. In some embodiments, the method still further includes the server (i) generating training results based on the at least one response and the at least one audio test and (ii) displaying the training results via the web-based interface.

These as well as other aspects, advantages, and alternatives will become apparent to those of ordinary skill in the art by reading the following description, with reference where appropriate to the accompanying drawings. Further, it should be understood that the description provided by this document, including this summary section, is intended to explain the present system, server, and method by way of example only and that numerous variations may be possible.

DETAILED DESCRIPTION

The following detailed description describes various features and functions of the disclosed systems and methods with reference to the accompanying figures. In the figures, similar symbols typically identify similar components, unless context dictates otherwise. The illustrative system and method embodiments described herein are not meant to be limiting. Certain aspects of the disclosed systems and methods can be arranged and combined in a wide variety of different configurations, all of which are contemplated herein.

1. Example Training System

Figure 1A:
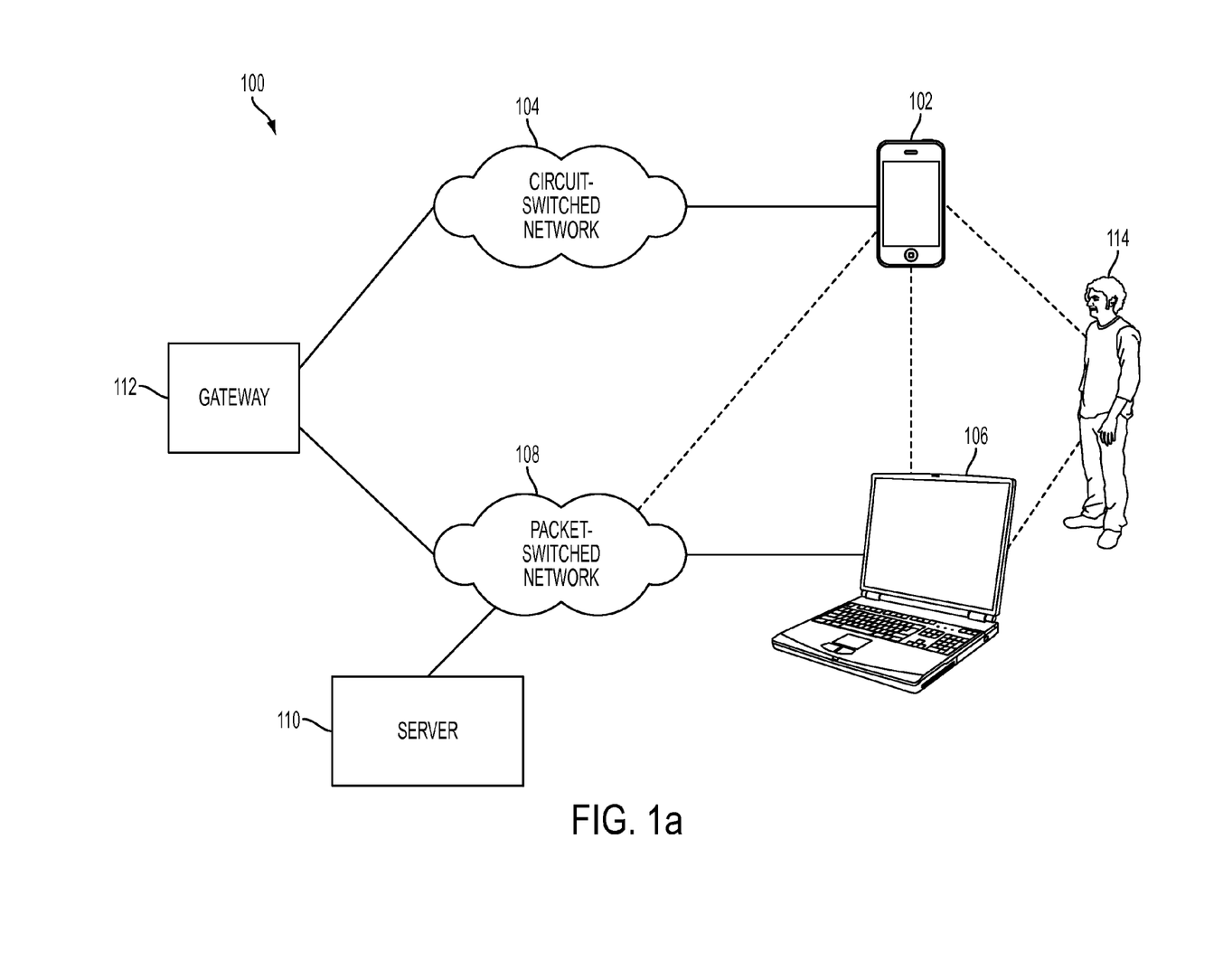
FIGS. 1a-b show overviews of networks in which an example training system may be implemented in accordance with some embodiments.

FIG. 1a shows an overview of a network in which an example training system may be implemented in accordance with some embodiments. It should be understood, of course, that this and other arrangements and functions described herein are provided by way of example only and that numerous variations may be possible. For instance, elements can be added, omitted, combined, distributed, reordered, repositioned, or otherwise changed while remaining within the scope of the invention as defined by the claims. Further, it should be understood that various functions described herein can be carried out by hardware, firmware, and/or software (e.g., one or more processors programmed with machine language instructions to carry out the functions).

As shown, network 100 includes a voice terminal 102 coupled to a circuit-switched network 104. Network 100 also includes a data terminal 106 and a server 110 coupled to a packet-switched network 108. Additionally, network 100 includes a gateway 112 connected between the circuit-switched network 104 and the packet-switched network 108.

Voice terminal 102 may be coupled to the circuit-switched network 104 through a switch or other connection. In an embodiment, the circuit-switched network 104 may be the Public Switched Telephone Network (PSTN) and the switch may be a standard telephone switch. Other examples are possible as well.

For example, as shown by the dotted line extending between voice terminal 102 and the packet-switched network 108, voice terminal 102 may also be coupled to the packet-switched network 108 through, for example, a proxy or other connection. In some embodiments, the packet-switched network 108 may be the Internet, and the proxy may be a Session Initial Protocol (SIP) proxy, such as a Call Session Control Function (CSCF). In these embodiments, voice terminal 102 may be configured to place and receive communications over the packet-switched network, such as Voice over Internet Protocol (VoIP) communications.

As shown by the dotted line extending between voice terminal 102 and data terminal 106, voice terminal 102 may also be coupled to the packet-switched network 108 through data terminal 106 and one or more other devices, such as an analog adapter. In this embodiment as well, voice terminal 102 may be configured to place and receive communications, such as VoIP communications, over the packet-switched network. Voice terminal 102 is further described below in connection with FIG. 2.

Data terminal 106 may be coupled to the packet-switched network 108 through one or more wired or wireless links. Data terminal 106 is further described below in connection with FIG. 3.

Server 110 may include one or more servers configured to carry out the server functions described herein. Server 110 may be coupled to the packet-switched network 108 through one or more wired or wireless links. Server 110 is further described below in connection with FIG. 3.

As shown in FIG. 1a, network 100 further includes a gateway 112 that is connected to both the circuit-switched network 104 and the packet-switched network 108. Gateway 112 may be any entity configured to interface between circuit-switched network 104 and packet-switched network 108. In general, gateway 112 may be configured to translate between protocols used in the circuit-switched network, such as the Signaling system #7 (SS7) protocol, and protocols used in the packet-switched network, such as SIP.

As shown in FIG. 1a, network 100 may be accessed by a user 114. As indicated by the dotted line extending between user 114 and voice terminal 102, user 114 may use voice terminal 102 to initiate and receive communications via one or both of the circuit-switched network 104 and the packet-switched network 108. Similarly, as indicated by the dotted line extending between user 114 and data terminal 106, user 114 may use data terminal 106 to access the packet-switched network 108. The user may be a hearing prosthesis recipient (such as a cochlear implant recipient, for example), or may be any other kind of user.

Network 100 may additionally include elements instead of or in addition to those shown. For example, network 100 may additionally include one or more base transceiver stations, base station controllers, mobile switching centers, packet data serving nodes, home agents, and/or authentication, authorization, and accounting servers for allowing wireless communication among voice terminal 102, data terminal 106, and server 110.

Figure 1B:
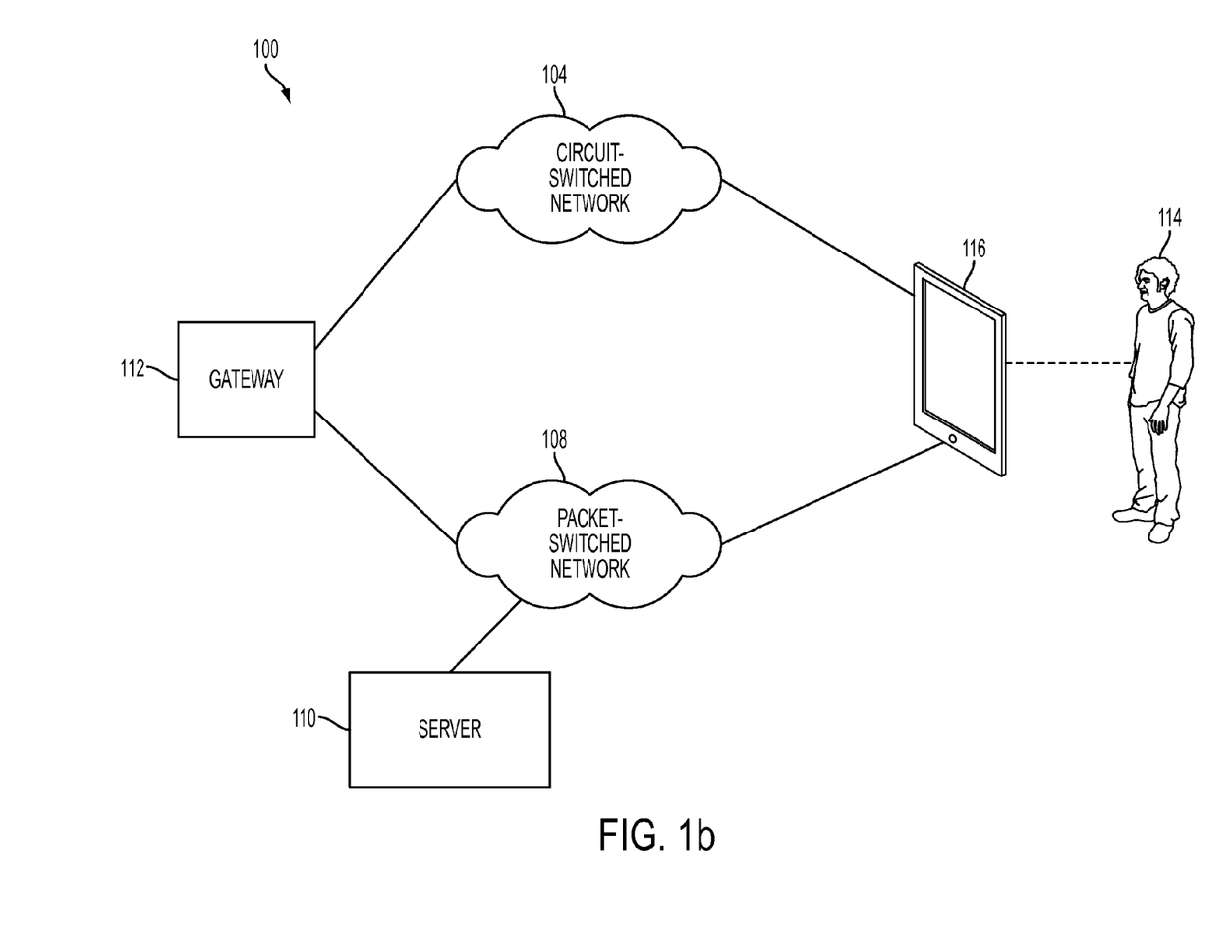

While in FIG. 1a voice terminal 102 and data terminal 106 are shown as separate elements, in an embodiment voice terminal 102 and data terminal 106 may be combined in a single device. FIG. 1b shows an overview of a network in which an example training system may be implemented in accordance with some embodiments. As shown in FIG. 1b, network 100 includes a combined voice and terminal 116 coupled to each of the circuit-switched network 104 and the packet-switched network 108. In general, combined voice and data terminal 116 may be any device configured to connect to both the circuit-switched network 104 and the packet-switched network 108, such as a smartphone, personal digital assistant (PDA), laptop computer, tablet computer, or other device. In some embodiments, combined voice and data terminal 116 may be configured to connect to the circuit-switched network 104 using one or more applications running on combined voice and data terminal 116, such as Skype™, FaceTime™, Google Talk™, or another application.

Figure 2:
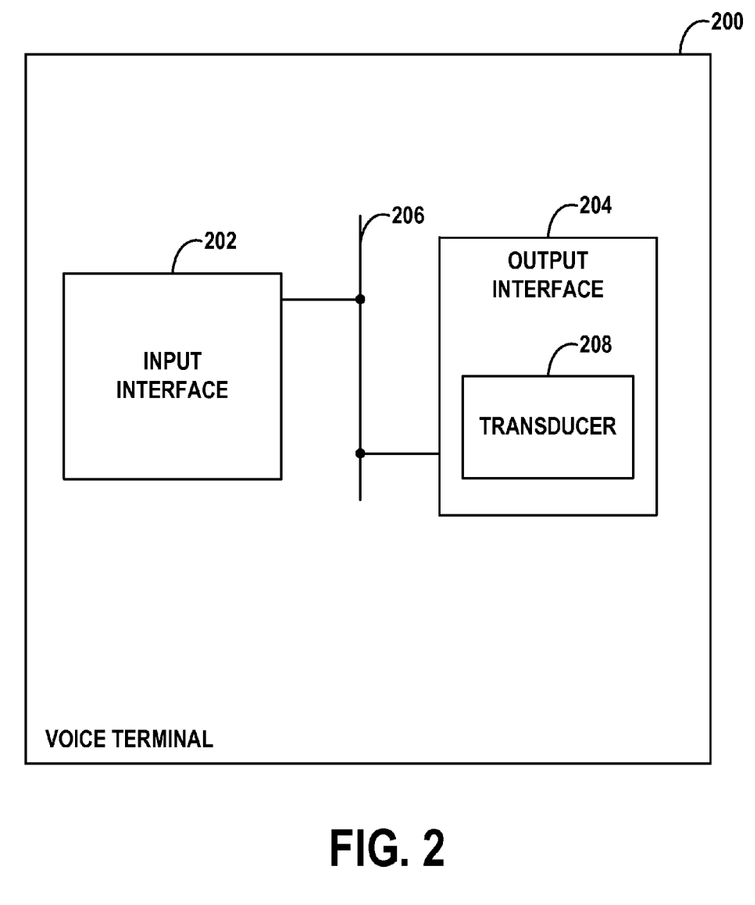
FIG. 2 shows an overview of an example voice terminal in accordance with some embodiments.

FIG. 2 shows an overview of an example voice terminal in accordance with an embodiment. Voice terminal 200 may be, for example, a telephone. In some embodiments, voice terminal 200 may be a landline telephone connectable to a circuit-switched network (e.g., the PSTN) via one or more wired links. In other embodiments, voice terminal 200 may be a landline telephone connectable to a packet-switched network (e.g., the Internet) via one or more wired links and an analog adapter. In still other embodiments, voice terminal 200 may be a cellular telephone connectable to a circuit-switched network (e.g., the PSTN) via a wireless connection and one or more base stations and/or other access network entities. In yet other embodiments, voice terminal 200 may be an Internet Protocol telephone connectable to a packet-switched network (e.g., the Internet) via a wired or wireless connection. In still further embodiments, voice terminal 200 may be a device configured specifically to operate within the disclosed training system. Other types of voice terminals are possible as well.

In any case, voice terminal 200 is identifiable by a unique or semi-unique identifier such as a PSTN telephone number (E.164), mobile identification number (MIN), mobile directory number (MDN), international mobile subscriber identifier (IMSI), username, email address, or the like, which can be used to establish a communication session with voice terminal 200. The voice terminal 200 may share a semi-unique identifier with one or more other voice terminals, such as when the voice terminal is one of multiple landline telephones in a home or office. Other examples are possible as well.

As shown, voice terminal 200 includes an input interface 202 and an output interface 204 connected together by a system bus or other mechanism 206.

Input interface 202 is configured to receive at least one audio test signal from a server. To this end, input interface 202 may include a wired or wireless interface through which voice terminal 200 may be connected, either directly or indirectly, to a network, such that voice terminal 200 and the server are coupled via one or more networks (e.g., wireless networks, the PSTN, packet networks, etc. as described with respect to FIGS. 1a and 1b).

Output interface 204 includes a transducer 208 and is configured to output at least one audio test corresponding to the audio test signal received at input interface 202. To this end, output interface 204 includes a transducer 208, which may be, for example, an electroacoustic transducer or speaker. The audio test may be any audible sound, such as a prerecorded spoken phrase, spoken by a human or machine voice, or audio output at a particular frequency. In some cases the audio tests may be prerecorded phrases spoken by friends or relatives. Other audio tests are possible as well.

Voice terminal 200 may additionally include one or more elements instead of or in addition to those shown. As an example, voice terminal 200 may additionally include one or more user input interfaces such as a keypad for receiving input from a user, and/or a display for displaying information to a user. Other examples are possible as well.

Figure 3:
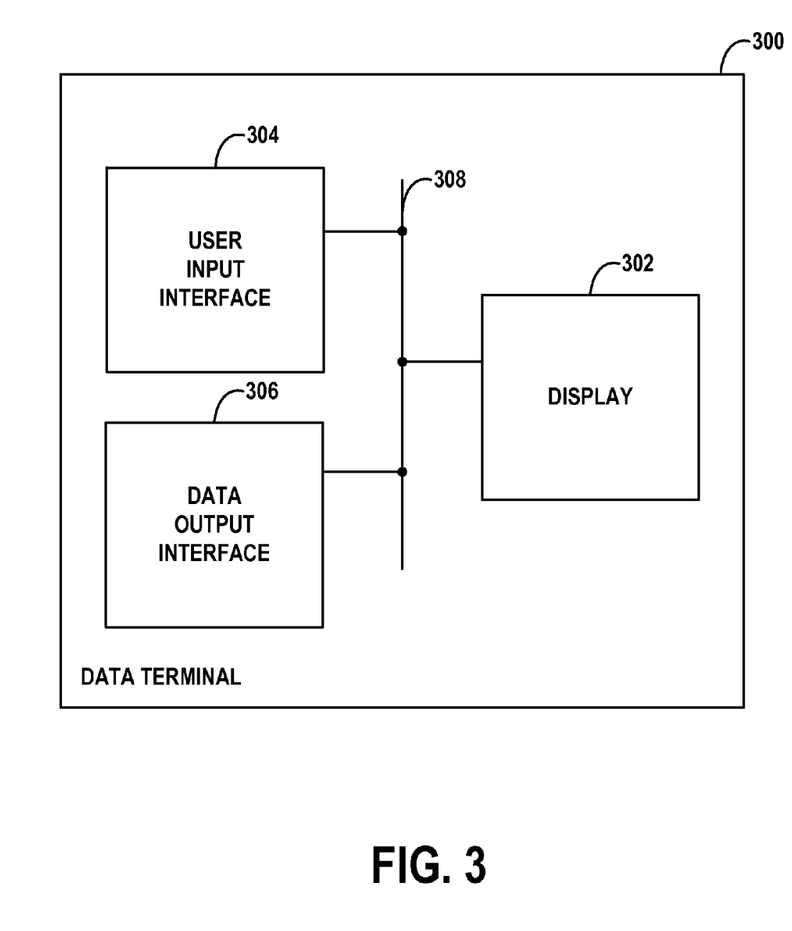
FIG. 3 shows an overview of an example data terminal in accordance with some embodiments.

FIG. 3 shows an overview of an example data terminal in accordance with an embodiment. Data terminal 300 may be, for example, a computer or other electronic device. In an embodiment, data terminal 300 may be combined with voice terminal 300 into a single device, such as a smart phone, personal digital assistant (PDA), or a device configured specifically to operate within the disclosed training system.

As shown, data terminal 300 includes a display 302, a user input interface 304, and a data output interface 306 connected together by a system bus or other mechanism 308.

Display 302 is configured to display a web-based interface provided by a server. The web-based interface may be, for example, a website provided by the server and accessed by the data terminal 300. Alternately, the web-based interface may be an application or program supported by the server and running on the data terminal 300. The application may be, for example, a mobile application or other software designed to run on the data terminal 300. The application may be pre-stored on the data terminal 300, or may be downloaded from, for example, the server via, for example, the packet-switched network. In any case, the application may be configured to support a wireless connection between the data terminal 300 and the server. Display 302 may be any type of display, such as flat panel, liquid crystal, plasma, or other display. Example web-based interfaces are shown in FIGS. 7a-g and are described below.

User input interface 304 is configured to receive an identifier identifying the voice terminal as well as at least one response to the audio test output by the voice terminal. To this end, user input interface 304 may include one or more of a keyboard, mouse, joystick, trackball, touchscreen, microphone, or other input device. A user may use user input interface 304 to input the identifier and the response. Once the response is received through user input interface 304, an indication of the response may be displayed on the web-based interface shown on the display 302. Example web-based interfaces with responses are shown in FIGS. 7a-f and are described below.

Data output interface 306 is configured to transmit the identifier and the response to the server. To this end, data output interface 306 may include a wired or wireless interface through which data terminal 300 may be connected, either directly or indirectly, to a packet-switched network, such that data terminal 300 and the server are coupled via at least the packet-switched network.

Data terminal 300 may additionally include one or more elements instead of or in addition to those shown. As an example, data terminal 300 may additionally include one or more interfaces for connecting to one or more peripheral devices, such as a printer, scanner, or other device. Other examples are possible as well.

Figure 4:
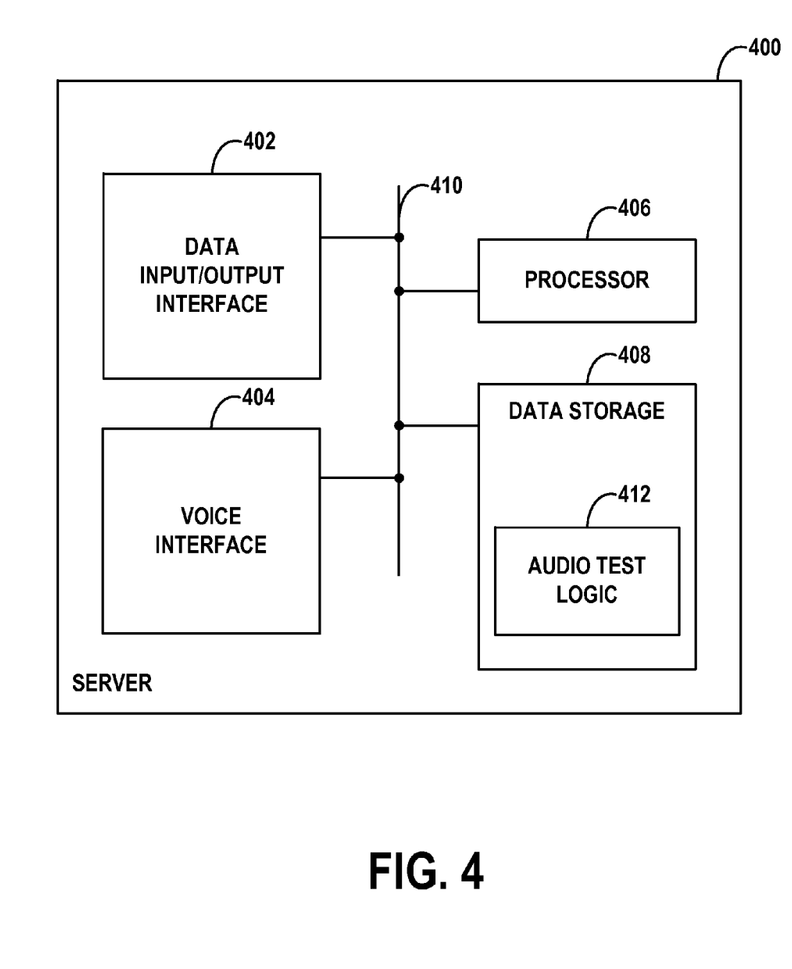
FIG. 4 shows an overview of an example server in accordance with some embodiments.

FIG. 4 shows an overview of an example server in accordance with an embodiment. Server 400 may be, for example, a computer or a plurality of computers on which one or more programs and/or applications are run in order to provide one or more web-based interfaces that are accessible via a packet-switched network. As noted above, the web-based interfaces may be, for example, websites provided by the server 400 and accessible by a data terminal and/or applications or programs supported by the server 400 and executable on the data terminal. In particular, server 400 may be, for example, a web server configured to deliver HyperText Markup Language (HTML) documents to one or more clients, such as the data terminal, via the packet-switched network in response to a request, such as a HyperText Transfer Protocol (HTTP) request, from the data terminal.

As shown, server 400 includes a data input/output interface 402, a voice interface 404, a processor 406, and data storage 408 connected by a system bus or other mechanism 410.

Data input/output interface 402 is configured to provide the web-based interface to the data terminal and to receive, from the data terminal and via the web-based interface, both the identifier identifying the voice terminal and the response to the audio test. To this end, data input/output interface 402 may include a wired or wireless interface through which server 400 may be connected, either directly or indirectly, to a packet-switched network, such that server 400 and the data terminal are coupled via at least the packet-switched network.

Voice interface 404 is configured to transmit at least one audio test signal to the voice terminal. To this end, voice interface may also include a wired or wireless interface through which server 400 may be connected, either directly or indirectly, to a packet-switched network. In some embodiments, data input/output interface 402 and voice interface 404 may be combined.

As shown in FIG. 1, server 400 may be connected to the voice terminal in several ways, depending on the voice terminal. In some embodiments, the voice terminal may be a landline or cellular telephone connected to a circuit-switched network (e.g., the PSTN) via one or more wired links. In these embodiments, server 400 may be connected to a gateway via the packet-switched network, and the gateway may be connected to the voice terminal via the circuit-switched network.

In other embodiments, the voice terminal may be a landline telephone connected to a packet-switched network (e.g., the Internet) via one or more wired links and/or an analog adapter. In some embodiments, server 400 may be connected to the analog adapter via the packet-switched network, and the analog adapter may be connected to the voice terminal.

In yet other embodiments, the voice terminal may be an Internet Protocol telephone connected to a packet-switched network (e.g., the Internet) via a wired or wireless connection. In this embodiment, server 400 may be connected to the voice terminal via the packet-switched network.

Processor 406 may comprise one or more general purpose processors (e.g., Intel™ microprocessors) and/or dedicated processors (e.g., digital signal processors). Data storage 408, in turn, may comprise one or more magnetic, optical, organic, or other storage components, whether volatile or non-volatile. In an embodiment, data storage 408 may be external to server 400, such as in a local database directly connected to server 400 or in a remote database accessible by server 400 via the Internet.

Data storage 408 may include a database of audio test signals corresponding to a plurality of audio tests. Some audio tests may be available to all users of the training system, while some audio tests may be customized for particular users. For example, data storage 408 may include personalized audio tests made by converting custom text received from a user. As another example, data storage 408 may include personalized audio tests recorded by friends or relatives of a particular user for the user. Other examples are possible as well. Additionally, data storage 408 may include stored training results for a plurality of users. Additionally, data storage 208 may include audio test logic 412. In some embodiments, audio test logic 412 may also be separate from data storage 408.

In an embodiment, audio test logic 412 is executable by processor 406 to select the audio test (and thus the corresponding audio test signal) to send to the data terminal. Further, audio test logic 412 is executable by processor 406 to determine whether the response to the audio test is correct or incorrect. Still further, audio test logic 412 is executable by processor 406 to store the response in data storage, such as data storage 408. In an embodiment, audio test logic 412 is also executable by processor 406 to (i) generate training results based on one or more audio tests, (ii) a difficulty of the audio tests, and/or (iii) responses to the audio tests. Further, audio test logic 412 is also executable by processor 406 to display the training results via the web-based interface so that a user may view the training results on the data terminal displaying the web-based interface. The training results may thus be accessible to a user of the data terminal via the web-based interface. In some embodiments, the training results may additionally be accessible to, for example, a clinician or other party via a web-based interface at another terminal. Audio test logic 412 may additionally be executable by processor 406 to carry out any of the server functions described herein. Server 400 may additionally include one or more elements instead of or in addition to those shown. As an example, server 400 may additionally include one or more user input interfaces such as a keypad for receiving input from a user, and/or a display for displaying information to a user. Other examples are possible as well.

As described in connection with FIGS. 1-4, the voice terminal is configured to receive audio test signals from the server and output audio tests corresponding to the audio test signals. In some cases, the voice terminal may additionally be configured to receive audio input from a user and to transmit the audio input to the server. Audio input from the user may be used by the server to, for example, determine frequencies that are best and least heard by the user. Other uses of the audio input are possible as well.

Thus, as shown, the disclosed training system includes a voice terminal, a data terminal (which may be implemented in the same device as the voice terminal), and a server. Interactions between each of the voice terminal, the data terminal, and the server may be better understood with reference to FIGS. 5 and 6.

2. Example Training Method

Figure 5:
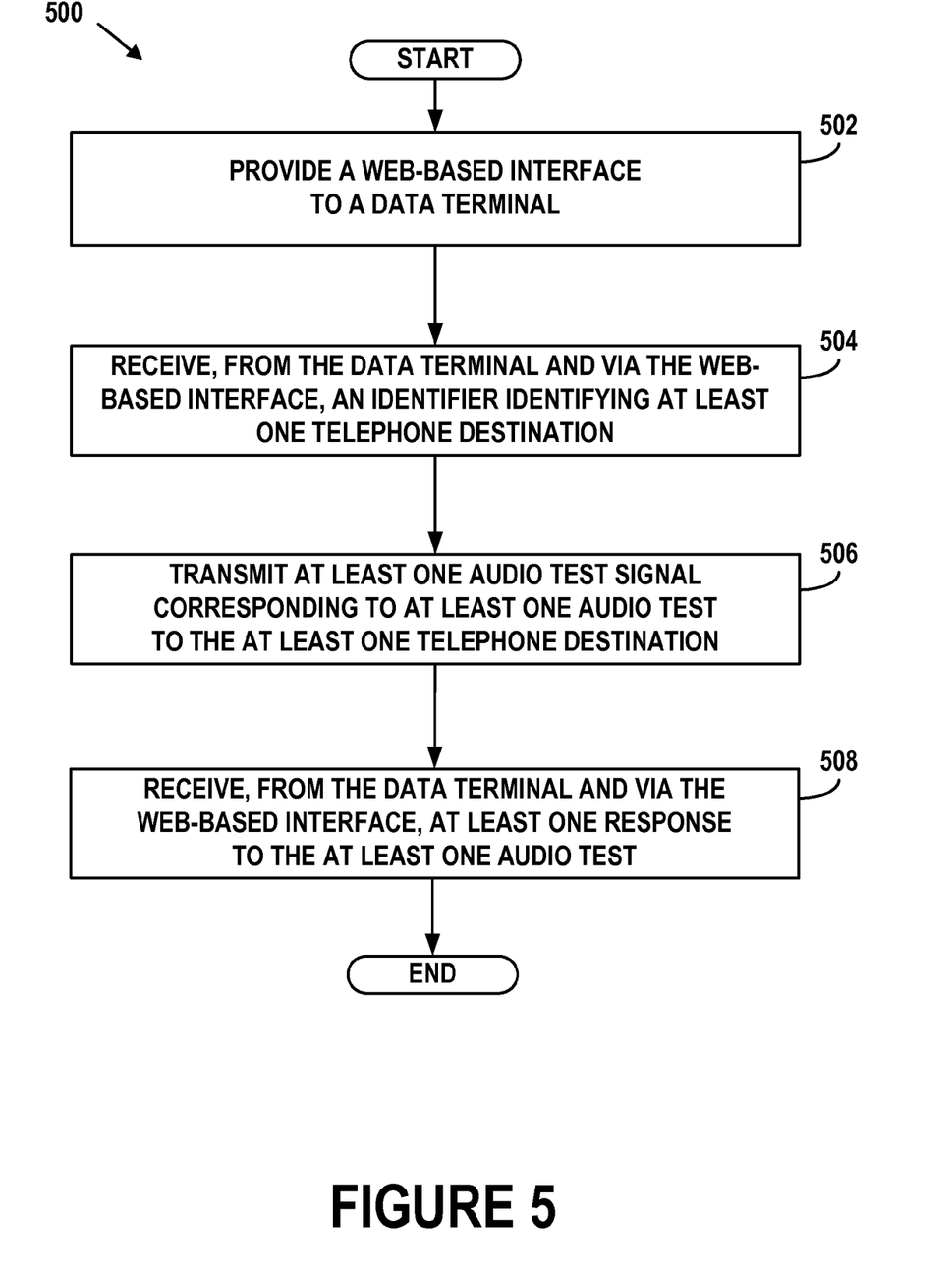
FIG. 5 is a flow chart illustrating a training method in accordance with some embodiments.

FIG. 5 is a flow chart illustrating a training method in accordance with an embodiment. Method 500 may include one or more operations, functions, or actions as illustrated by one or more of blocks 502, 504, 506, and/or 508. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

Method 500 begins at block 502 where the server provides a web-based interface to the data terminal. Example web-based interfaces are shown in FIGS. 7a-g and are described below.

At block 504, the server receives, from the data terminal and via the web-based interface, an identifier identifying at least one telephone destination. The telephone destination may be, for example, a voice terminal such as the voice terminal described above in connection with FIG. 2. The identifier may be any unique or semi-unique identifier, such as a telephone number.

At block 506, the server transmits at least one audio test signal corresponding to at least one audio test to the telephone destination. Depending on the telephone destination, the server may transmit the audio test signal directly to the telephone destination via a packet-switched network, or the audio test signal may be routed through one or more packet-switched networks, circuit-switched networks, gateways, and/or adapters.

The audio test may take several forms including, for example, a prerecorded spoken phrase or audio output at a particular frequency. In an embodiment, the audio test may be a personalized audio test created using custom text received from a user. In particular, the data terminal may be configured to receive custom text from a user and may transmit the custom text to the server. The server may convert the custom text to a personalized audio test using, for example, a speech synthesis system running a text-to-speech or phonetics-to-speech program. Other examples are possible as well. In another embodiment, the audio test may be a personalized audio test recorded by, for example, a friend or relative of the user.

At block 508, the server receives, from the data terminal and via the web-based interface, at least one response to the audio test. Depending on the audio test, the response may take several forms. For example, in an embodiment, the audio test may be a prerecorded spoken phrase, and the response may be one or more of textual input of at least a portion of the prerecorded spoken phrase, a selection of a text version of the prerecorded spoken phrase from a plurality of available text versions of phrases, a request to repeat the prerecorded spoken phrase, an indication of how well a user heard the prerecorded spoken phrase, an indication of whether the prerecorded spoken phrase was the same as or different than a previous prerecorded spoken phrase, and a selection of a graphical image corresponding to the prerecorded spoken phrase. As another example, in another embodiment, the audio test may be audio output at a particular frequency, and the response may be an indication of how well the user heard the audio test. Other examples are possible as well.

In an embodiment, after or substantially simultaneously with block 506, the server may display, via the web-based interface, a visual cue related to the audio test, such as one or more of an image related to the audio test, a light indicating a pattern of sounds in the audio test, and a visual representation of a pair of lips speaking the audio test. Each of these visual cues may aid a user in understanding the audio test output by the voice terminal. In some cases, these visual cues may be optional, such that a user may opt to show or not show them. In other cases, the visual cues may be used in early audio tests, but not in later tests. Other cases are possible as well.

In an embodiment, the method 500 may additionally include the server determining whether the response is correct or incorrect. In some cases, responsive to determining that the at least one response is incorrect, the server may retransmit the audio test signal to the telephone destination, either immediately or at a later time, in order to allow the user to re-hear the audio test. Alternatively or additionally, in some cases, responsive to determining that the at least one response is incorrect, the server may display a hint via the web-based interface. The hint may include, for example, any of the visual cues described above. Alternatively or additionally, the hint may include a portion of a word or words spoken in the audio test. Other hints are possible as well. Alternatively or additionally, responsive to determining that the at least one response is incorrect, the server may select an additional audio test based on one or more of (i) the previous audio test, (ii) a difficulty of the previous audio test, and (iii) the response to the previous audio test. For example, the server may select an additional audio test that tests similar skills, sounds, words, and/or frequencies as the previous audio test, and/or the server may select an additional audio test that is easier than the previous audio test, and/or the server may select an additional audio test that tests similar skills, sounds, words, and/or frequencies as those in the response to the previous audio test. Other examples are possible as well.

In an embodiment, the method 500 may additionally include the server recording the at least one response. Further, the method 500 may include the server generating training results based on the response and the audio test and displaying the training results via the web-based interface. The training results may include, for example, a history of audio tests taken by the user, scores on various audio tests, a graphical representation of the user's training progress over time, a comparison of the user's scores with compiled scores of other users, and/or an indication of particular skills the user needs to work on. Other examples are possible as well. An example of a web-based interface displaying training results is shown in FIG. 7g and is described below. In an embodiment, the method 500 may additionally include the server displaying one or more tips on telephone usage via the web-based interface. For example, the server may display tips on how to position a telephone (or other voice terminal or sound processor) next to the ear, or on how to adjust one or more settings on the telephone, such as a sensitivity of the transducer. As another example, the server may display a recommendation for clinical follow-up in the event that certain sounds or frequencies are repeatedly misheard. The server may, for example, display a report that the user may print out and bring to the clinical follow-up. Alternatively, the report may be accessible by a clinician at the clinical follow-up by accessing the server via, for example, a web-based interface. The server may display other tips as well. These tips may be general, or the tips may be selected by the server based on one or more of the audio test, a difficulty of the audio test, and the response.

In an embodiment, block 502 may be carried out continuously, and blocks 504-508 may be triggered by receipt of the identifier from the data terminal via the web-based interface. In an embodiment, once blocks 504-508 are triggered, blocks 506 and 508 may be carried out continuously until another trigger occurs, for example when one or both of the voice terminal and the data terminal disconnect from the packet-switched network. Other examples are possible as well.

Figure 6:
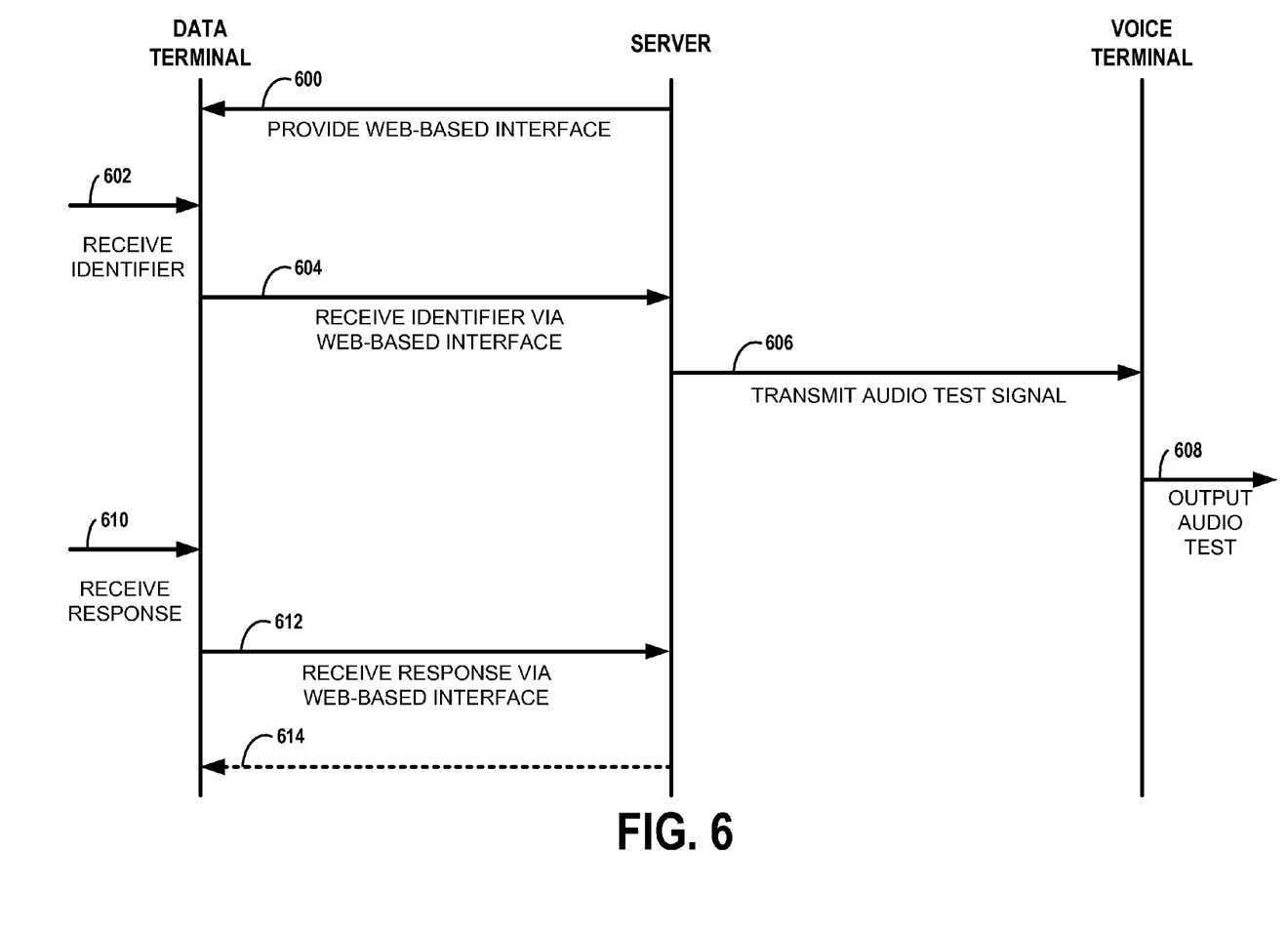
FIG. 6 is a simplified communication flow diagram illustrating a training method in accordance with some embodiments.

FIG. 6 is a simplified communication flow diagram illustrating a training method in accordance with an embodiment. It is to be understood that while FIG. 6 assumes successful communication between each of the voice terminal, the data terminal, and the server, in some cases one or more of communications 600, 602, 604, 606, 608, 610, and 612 may be unsuccessfully transmitted. Each of the voice terminal, the data terminal, and the server may be configured to retransmit communications in case of an unsuccessful transmission according to one or more known protocols.

As shown, with communication 600 the server provides a web-based interface to a data terminal. As noted above, the server may continuously provide the web-based interface, and at a particular instance the data terminal may access the web-based interface. The data terminal accessing the web-based interface may involve, for example, a user of the data terminal entering a website address into a web browser or running an application on the data terminal. In general, the data terminal accessing the web-based interface involves the data terminal being in communication with the server via a packet-switched network, such as the Internet. Other examples are possible as well. In any case, once the data terminal has accessed the web-based interface, the data terminal displays the web-based interface.

With communication 602, the data terminal receives, from the user, an identifier identifying a voice terminal. For example, the data terminal may receive a telephone number. The data terminal receiving the identifier from the user may involve the user typing or otherwise entering the identifier into the web-based interface as displayed by the data terminal.

With communication 604, the server receives the identifier from the data terminal via the web-based interface. Using the received identifier, the server may initiate and establish a connection (not shown) with the voice terminal.

Once the connection between the server and the voice terminal is established, the server transmits an audio test signal to the voice terminal with communication 606. Upon receiving the audio test signal, the voice terminal outputs an audio test corresponding to the audio test signal with communication 608.

The user of the data terminal is also a user of the voice terminal. Thus, the user may hear the audio test output by the voice terminal and may, in response, input a response to the data terminal. With communication 610, the data terminal receives the response from the user. The data terminal receiving the response may involve the user typing or otherwise entering the response into the web-based interface as displayed by the data terminal.

With communication 612, the server receives the response from the data terminal via the web-based interface. Using the received response, the server may, with communication 614, for example, (i) display the response via the web-based interface, (ii) display one or more visual cues or hints, (iii) indicate whether the response is correct or incorrect, (iv) retransmit the audio test signal to the voice terminal, (v) select an additional audio test signal, (vi) transmit the additional audio test signal to the voice terminal, (vii) record the response, (viii) generate training results for the user based on the response, and/or (ix) display training results for the user. Other examples are possible as well.

After communication 614, one or more communications may be transmitted between the server and the data terminal and/or the server and the voice terminal. In general, communications similar to communications 606, 608, 610, 612, and 614 may continue until one or both of the data terminal becomes disconnected from the server.

3. Example Web-Based Interface

FIGS. 7*a-g* show an example web-based interface in accordance with an embodiment. As noted above, the web-based interface may be, for example, a website provided by a server and accessible by a data terminal. Alternately, the web-based interface may be an application or program supported by the server and running on the data terminal.

It is to be understood that each of FIGS. 7*a-g* is merely illustrative and is not meant to be limiting. The web-based interface may include features and functions instead of and/or in addition to those shown.

Figure 7A:
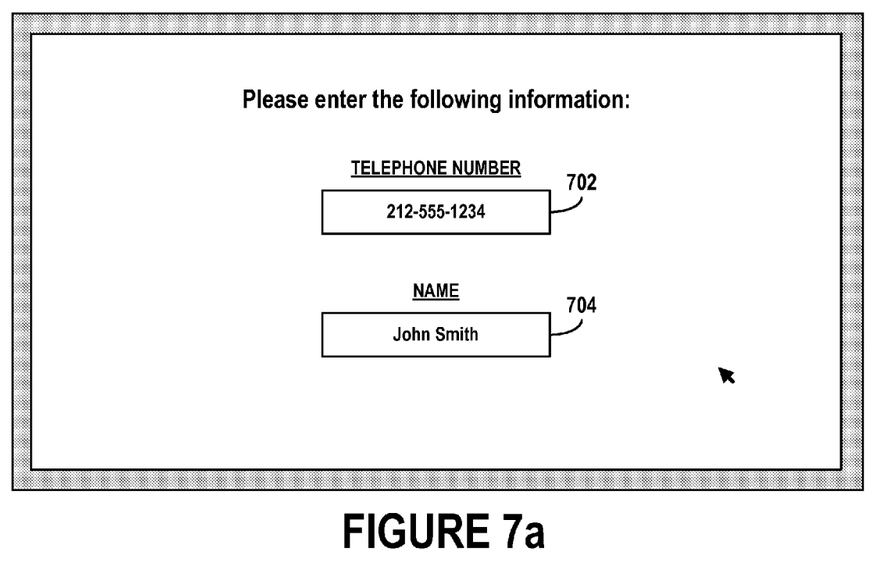
FIGS. 7a-g show example web-based interfaces in accordance with some embodiments.

FIG. 7*a* shows an example web-based interface prompting a user to enter an identifier 702 and a name 704. As shown, the user (John Smith) has entered a telephone number as well as his name. With the telephone number, the server may establish a communication session with the voice terminal identified by the identifier. In an embodiment, instead of a name the user may be prompted to enter a predetermined user identification of some kind or email address, and in some cases may additionally be prompted to enter a password. Other examples are possible as well.

Figure 7B:
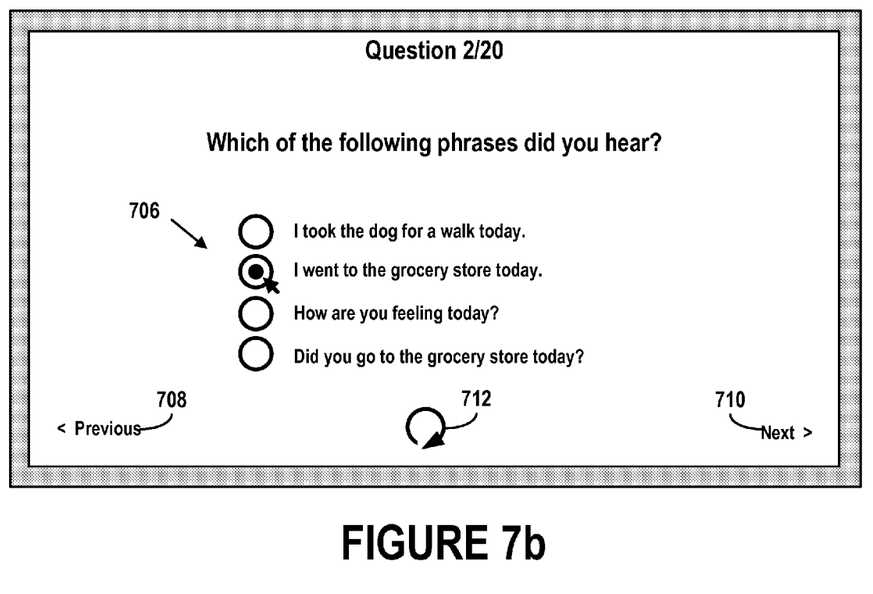

FIG. 7*b* shows an example web-based interface prompting a user to enter a response to an audio test. The audio test may be a prerecorded spoken phrase output by the voice terminal. For example, the voice terminal may have output the prerecorded phrase "I went to the grocery store today." Upon hearing the audio test, the user may select a text version of the prerecorded spoken phrase from a plurality of available text versions 706, as shown. Additionally, the user has the option to return to a previous question 708 or to move on to the next question 710. Further, the user may be able to request a repeat 712 of the audio test. In an embodiment, when the user requests a repeat 712, the data terminal may transmit to the server a request to repeat the audio test. Upon receiving the request, the server may retransmit the audio test signal to the voice terminal, and the voice terminal may re-output the audio test.

Figure 7C:
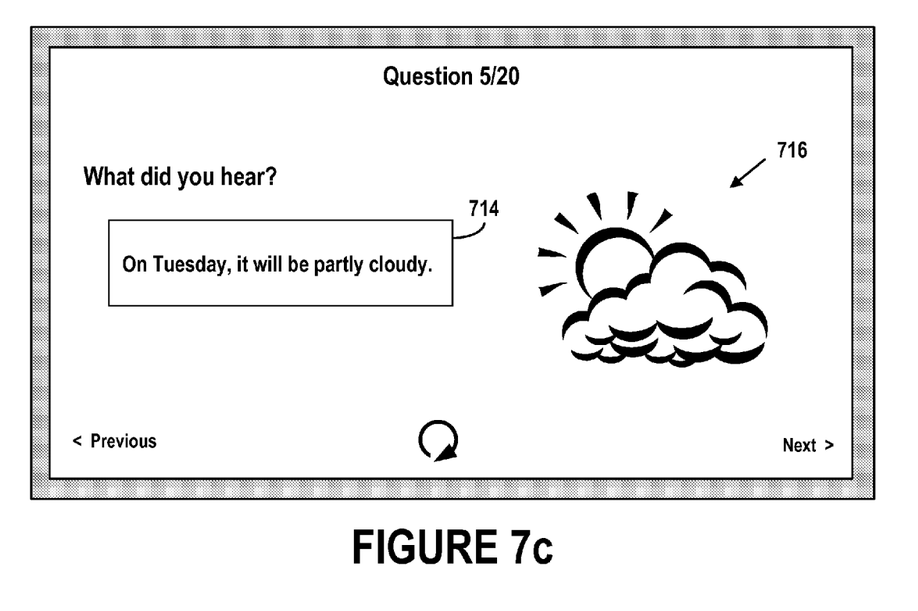

FIG. 7*c* shows an example web-based interface prompting a user to enter a textual input 714 of a prerecorded spoken phrase. The audio test may be the prerecorded spoken phrase output by the voice terminal. For example, the voice terminal may have output the phrase "On Tuesday, it will be partly cloudy." Upon hearing the audio test, the user may enter the textual input 714 of at least a portion of the prerecorded spoken phrase. In an embodiment, in determining whether the response to the audio test (textual input 714) is correct or incorrect, the server may be configured to ignore or accept minor variations in the textual input 714, such as varying capitalization and punctuation or minor spelling errors. In an embodiment, a threshold is used. For example, a textual input

714 that is 95% correct (i.e., having 5% errors) may be determined to be correct by server 400. Other examples are possible as well.

In addition to the textual input 714, the web-based interface includes a visual clue or hint 716. In an embodiment, the visual clue or hint 716 may be displayed at the request of the user, responsive to a determination that a response to the audio test was incorrect, or for another reason.

Figure 7D:
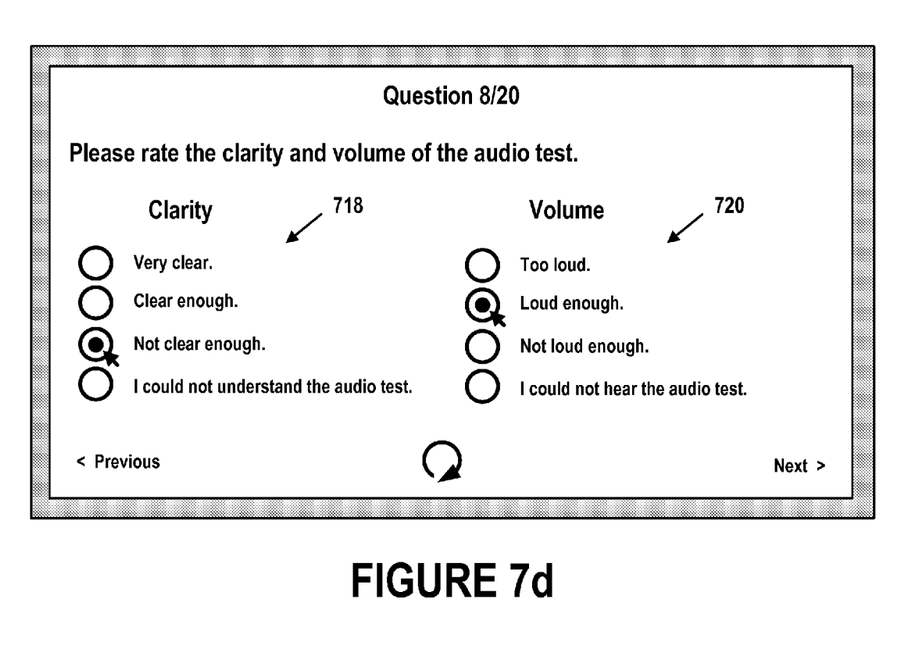

FIG. 7*d* shows an example web-based interface prompting a user to indicate how well the user heard an audio test. The audio test may be a prerecorded spoken phrase and/or audio output at a particular frequency. As shown, the user is presented with a first plurality of responses 718 with which to indicate a clarity of the audio test. Similarly, the user is presented with a second plurality of responses 720 with which to indicate a volume of the audio test. Other indications of how well the user heard the audio test, besides clarity and volume, are possible as well.

Figure 7E:
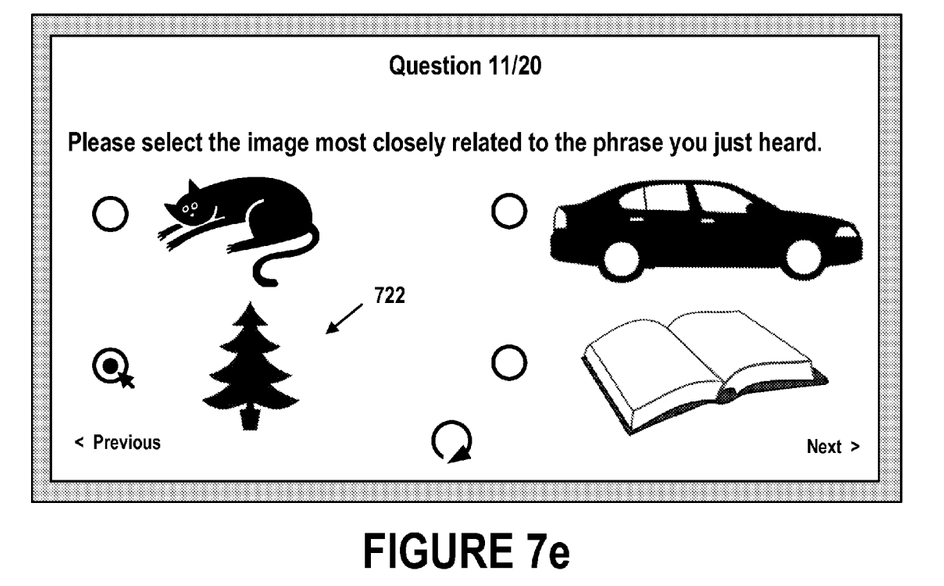

FIG. 7*e* shows an example web-based interface prompting a user to select a graphical image corresponding to a prerecorded spoken phrase. The audio test may be the prerecorded spoken phrase output by the voice terminal. For example, the voice terminal may have output the phrase "Today we are going to buy our Christmas tree." Upon hearing the audio test, the user may select the graphical image corresponding to the prerecorded spoken phrase, namely the graphical image of a tree 722. Other numbers and types of graphical images are possible as well.

Figure 7F:
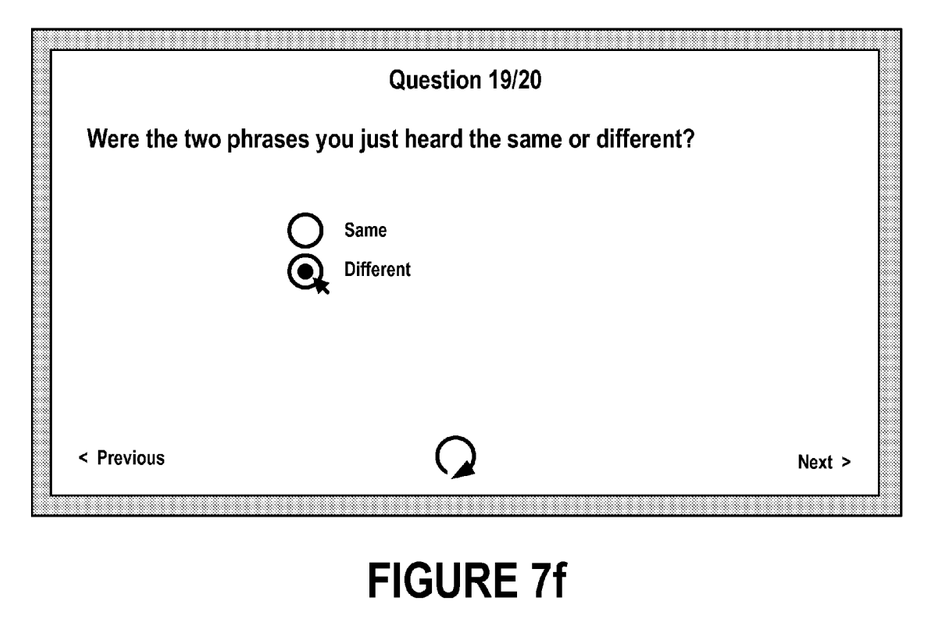
Figure 7G:
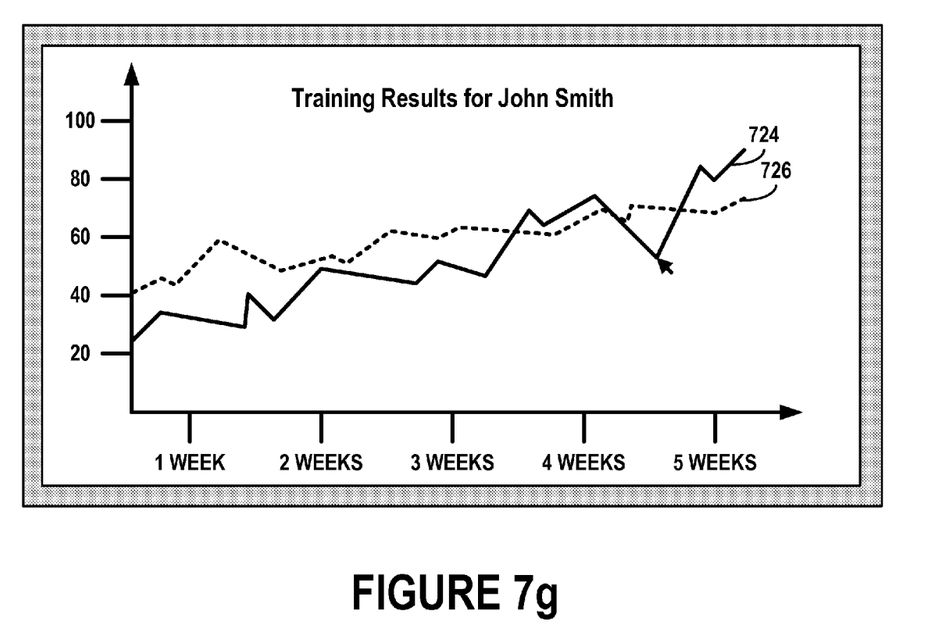

FIG. 7*f* shows an example web-based interface prompting a user to indicate whether a prerecorded spoken phrase was the same as or different than a previous prerecorded spoken phrase. The audio test may include two prerecorded spoken phrases output in succession by the voice terminal. For example, the voice terminal may have output the phrase "Today is Saturday" and then output the phrase "Today is Sunday." Upon hearing the prerecorded spoken phrases, the user may select "Same" or "Different" to indicate whether the prerecorded spoken phrases were the same or different.

FIG. 7*g* shows an example web-based interface displaying training results for a user. The training results may be generated by the server based on one or more audio tests, responses to the one or more audio tests, and/or training results from one or more additional users. As shown, the web-based interface includes a graphical representation of a user's audio test scores 724 and average audio test scores for a plurality of users 724 shown over time. In addition to the training results shown, the training results may include various other kinds of training results, such as a history of audio tests taken by the user, scores on various audio tests, a graphical representation of the user's training progress over time, and/or an indication of particular skills the user needs to work on. Other training results are possible as well.

The features and functions shown in FIGS. 7*a-g* may be modified, combined, adjusted, added to, replaced, or otherwise varied to create several variations, all of which are contemplated herein.

4. Alternate Embodiments

In a first alternate embodiment, a network in which an example training system may be implemented may include a voice terminal, a data terminal, and a server. The voice terminal may be coupled to the server via one or both of a circuit-switched network and a packet-switched network. Further, the data terminal may be coupled to the server via a packet-switched network.

The data terminal may be configured to display a client-based interface, such as an application or program supported running on the data terminal. The application may be, for example, a mobile application or other software designed to run on the data terminal and may be configured to support a wired or wireless communications connection between the data terminal and the server. Further, the data terminal may include a processor and data storage that includes a database of audio test signals corresponding to a plurality of audio tests, responses to the audio test signals, and training results, which may take any of the forms described above. Additionally, the data storage may include audio test logic executable by the processor to select an audio test (and thus the corresponding audio test signal) to display at the data terminal (e.g., via an application running on the data terminal), receive a response to the audio test (e.g., via the application running on the data terminal) and to determine whether the response to the audio test is correct or incorrect. Further, the audio test logic may be executable by the processor to store the response in the data storage. Still further, the audio test logic may be executable by the processor to display the training results at the data terminal (e.g., via the application running on the data terminal) for viewing by a user of the data terminal and/or a clinician or other party.

The server may include a data interface configured to receive an audio test signal from the data terminal and a voice interface configured to transmit the audio test signal to the voice terminal. The voice terminal may include an input interface configured to receive the audio test signal and an output interface (including, e.g., a transducer) configured to output to a user the audio test corresponding to the audio test signal received at input interface, as described above.

In a second alternate embodiment, a network in which an example training system may be implemented may include a voice terminal and a data terminal. The data terminal may be coupled to the voice terminal via a wired (e.g., Universal Serial Bus) and/or wireless (e.g. Bluetooth) connection. The data terminal may be configured to perform all of the functions of the data terminal in the first alternate embodiment, and may further be configured to transmit an audio test signal directly to the voice terminal. The voice terminal may be configured to perform all of the functions of the voice terminal in the first alternate embodiment, and may be further configured to receive a test signal directly from the voice terminal.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A server, comprising:
 a processor;
 data storage;
 a data input/output interface configured to provide a web-based interface to a data terminal and to receive, from the data terminal and via the web-based interface, (i) an identifier identifying a voice terminal and (ii) at least one response; and
 a voice interface configured to transmit to the voice terminal at least one audio test signal corresponding to at least one audio test that comprises at least one personalized audio test, wherein the at least one response is associated with the at least one audio test, and wherein the at least one personalized audio test includes content unique to a recipient of the at least one audio test.

2. The server of claim 1, wherein the identifier is a telephone number.

3. The server of claim 1, wherein the at least one audio test further comprises at least one prerecorded spoken phrase.

4. The server of claim 3, wherein the at least one response comprises at least one of (i) textual input of at least a portion of the prerecorded spoken phrase, (ii) a selection of a text version of the prerecorded spoken phrase from a plurality of available text versions of phrases, (iii) a request to repeat the prerecorded spoken phrase, (iv) an indication of how well a user heard the prerecorded spoken phrase, (v) an indication of whether the prerecorded spoken phrase was the same as or different than a previous prerecorded spoken phrase, or (vi) a selection of a graphical image corresponding to the prerecorded spoken phrase.

5. The server of claim 1, wherein the at least one audio test further comprises audio output at a particular frequency.

6. The server of claim 5, wherein the at least one response comprises an indication of how well the at least one audio test was heard.

7. The system of claim 1, wherein the data input/output interface is further configured to receive custom text and to convert the custom text into an audio signal included in the at least one personalized audio test.

8. The system of claim 1, wherein the voice terminal and the data terminal are a same device.

9. The server of claim 1, further comprising:
audio test logic executable by the processor to (i) select the at least one audio test, (ii) determine whether the at least one response is correct or incorrect, and (iii) store the at least one response in the data storage.

10. The server of claim 9, wherein the audio test logic is further executable by the processor to (iv) generate training results based on at least one of (a) the at least one audio test, (b) a difficulty of the at least one audio test, and (c) the at least one response, and (v) cause a component of the data terminal to display the training results via the web-based interface.

11. A method comprising:
a server providing a web-based interface to a data terminal;
the server receiving, from the data terminal and via the web-based interface, an identifier identifying at least one telephone destination;
the server transmitting to the at least one telephone destination at least one audio test signal corresponding to at least one audio test, wherein the at least one audio test comprises at least one personalized audio test that includes content unique to a test recipient; and
the server receiving, from the data terminal and via the web-based interface, at least one response to the at least one audio test.

12. The method of claim 11, further comprising, after transmitting the at least one audio test signal to the at least one telephone destination, the server displaying, via the web-based interface, at least one of (i) an image related to the at least one audio test, (ii) a light indicating a pattern of sounds in the at least one audio test, or (iii) a visual representation of a pair of lips speaking the at least one audio test.

13. The method of claim 11, further comprising the server determining whether the at least one response is correct or incorrect.

14. The method of claim 13, further comprising:
responsive to determining that the at least one response is incorrect, retransmitting the audio test signal to the at least one telephone destination.

15. The method of claim 13, further comprising:
responsive to determining that the at least one response is incorrect, displaying a hint via the web-based interface.

16. The method of claim 13, responsive to determining that the at least one response is incorrect, selecting an additional audio test, wherein the selection is based on at least one of (i) the at least one audio test, (ii) a difficulty of the at least one audio test, or (iii) the at least one response.

17. The method of claim 11, further comprising:
the server recording the at least one response.

18. The method of claim 17, further comprising:
generating training results based on the at least one response and the at least one audio test; and
causing a component of the data terminal to display the training results via the web-based interface.

19. The method of claim 11, further comprising:
the at least one telephone destination outputting the at least one audio test for detection by a hearing prosthesis.

20. A server, comprising:
at least one interface configured to provide a web-based interface to a voice-and-data terminal;
a processor;
data storage; and
audio test logic stored in the data storage, wherein the audio test logic is executable by the processor to:
receive, from the voice-and-data terminal and via the web-based interface, an identifier identifying the voice-and-data terminal;
transmit to the voice-and-data terminal at least one audio test signal corresponding to at least one audio test, wherein the at least one audio test comprises at least one personalized audio test that includes content unique to a test recipient; and
receive, from the voice-and-data terminal and via the web-based interface, at least one response to the at least one audio test.

21. The server of claim 20, wherein the web-based interface comprises an application running on the voice-and-data terminal.

22. The server of claim 20, wherein the identifier is a telephone number.

23. The server of claim 20, wherein the at least one audio test further comprises at least one prerecorded spoken phrase.

24. The server of claim 23, wherein the at least one response comprises at least one of (i) textual input of at least a portion of the prerecorded spoken phrase, (ii) a selection of a text version of the prerecorded spoken phrase from a plurality of available text versions of phrases, (iii) a request to repeat the prerecorded spoken phrase, (iv) an indication of how well a user heard the prerecorded spoken phrase, (v) an indication of whether the prerecorded spoken phrase was the same as or different than a previous prerecorded spoken phrase, or (vi) a selection of a graphical image corresponding to the prerecorded spoken phrase.

25. The server of claim 20, wherein the at least one audio test further comprises audio output at a particular frequency.

26. The server of claim 25, wherein the at least one response comprises an indication of how well the at least one audio test was heard.

27. The server of claim 20, wherein the at least one interface is further configured to receive custom text and to convert the custom text into an audio signal included in the at least one personalized audio test.

* * * * *